(12) United States Patent
Obayashi et al.

(10) Patent No.: US 7,501,104 B2
(45) Date of Patent: Mar. 10, 2009

(54) APPARATUS AND METHOD FOR TREATING DISCHARGE GAS

(75) Inventors: Yoshiaki Obayashi, Hiroshima (JP);
Kozo Iida, Hiroshima (JP); Toshio Koyanagi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 261 days.

(21) Appl. No.: 11/512,225

(22) Filed: Aug. 30, 2006

(65) Prior Publication Data

US 2007/0140939 A1   Jun. 21, 2007

(30) Foreign Application Priority Data

Dec. 19, 2005   (JP) .............................. 2005-364380

(51) Int. Cl.
*B01D 53/46* (2006.01)
*B01D 53/50* (2006.01)
*B01D 53/56* (2006.01)
*B01D 53/64* (2006.01)
*B01D 53/74* (2006.01)
*B01D 53/75* (2006.01)

(52) U.S. Cl. ................ 423/210; 423/239.1; 423/240 R; 423/242.1; 423/243.01; 423/DIG. 5; 423/DIG. 6; 422/105; 422/108; 422/111; 422/168; 422/169; 422/170; 422/171; 422/172; 422/177; 422/180

(58) Field of Classification Search ................ 422/105, 422/108, 111, 168, 169, 170, 171, 172, 177, 422/180; 423/210, 239.1, 240 R, 242.1, 423/243.01, DIG. 5, DIG. 6

See application file for complete search history.

(56) References Cited

U.S. PATENT DOCUMENTS

| | | | | |
|---|---|---|---|---|
| 6,375,909 | B1 * | 4/2002 | Dangtran et al. | ............ 423/235 |
| 6,638,485 | B1 | 10/2003 | Iida et al. | |
| 2003/0170159 | A1 | 9/2003 | Honjo et al. | |
| 2004/0253158 | A1 * | 12/2004 | Honjo et al. | ................ 423/210 |
| 2008/0112858 | A1 * | 5/2008 | DeBerry | ..................... 422/168 |

FOREIGN PATENT DOCUMENTS

| | | |
|---|---|---|
| JP | 10-230137 A | 9/1998 |
| JP | 2000-197811 A | 7/2000 |
| JP | 2003-53142 A | 2/2003 |

* cited by examiner

*Primary Examiner*—Timothy C Vanoy
(74) *Attorney, Agent, or Firm*—Westerman, Hattori, Daniels & Adrian, LLP.

(57) ABSTRACT

A discharge gas treatment apparatus and method which lower treatment cost and which attain efficient removal of mercury contained in a discharge gas are provided. The discharge gas treatment apparatus, includes a cooling apparatus for controlling the temperature of the discharge gas to a predetermined temperature in accordance with the hydrogen chloride concentration of the discharge gas; an $NO_x$ removal catalyst unit for reducing nitrogen oxide contained in the discharge gas and for causing reaction between mercury and hydrogen chloride contained in the discharge gas, the discharge gas having been controlled to the predetermined temperature and having been introduced to the apparatus, with ammonia being added thereto; and a wet-format desulfurization apparatus, disposed on the downstream side with respect to the $NO_x$ removal catalyst unit, for removing sulfur oxide and mercury chloride contained in the discharge gas through dissolving sulfur oxide and mercury chloride in a liquid absorbent.

10 Claims, 3 Drawing Sheets

APPARATUS AND METHOD FOR TREATING DISCHARGE GAS

BACKGROUND OF THE INVENTION

1. Field of the Invention

The present invention relates to an apparatus and method for removing mercury contained in a gas discharged from a boiler or a similar apparatus (hereinafter may be referred to as a discharge gas treatment apparatus and a discharge gas treatment method).

2. Background Art

Known methods for removing mercury contained in a discharge gas produced from a boiler, a gas turbine, a combustion furnace, etc. include a treatment method employing an adsorbent such as activated carbon and a gas-liquid contact method in which a liquid absorbent is sprayed onto a discharge gas in a scrubber.

Japanese Patent Application Laid-Open (kokai) No. 10-230137 discloses a discharge gas treatment method for removing mercury and $NO_x$. In the method, a mercury-chlorinating agent and ammonia are added to a discharge gas, whereby mercury chloride is formed from metallic mercury and $NO_x$ is removed, in the presence of a solid catalyst. Subsequently, wet-format $NO_x$ removal is performed by use of an alkaline liquid absorbent.

In the method, mercury chloride is formed through the following scheme (1):

$$2Hg+4HCl+O_2 \rightarrow 2HgCl_2+2H_2 \qquad (1).$$

The thus-formed mercury chloride is dissolved in water, to thereby remove mercury contained in the discharge gas.

Japanese Patent Application Laid-Open (kokai) No. 2000-197811 discloses a discharge gas mercury removal method. In the method, a discharge gas containing water-insoluble element-form mercury is brought into contact with a layer which is filled with at least one of a metal chloride, a metal bromide, a metal fluoride, and a metal iodide in the form of pellets or a honeycomb structure, whereby a water-soluble mercury species is formed. The thus-formed water-soluble mercury species is dissolved in a solution, to thereby remove mercury contained in the discharge gas.

Japanese Patent Application Laid-Open (kokai) No. 2003-53142 discloses an apparatus for removing mercury contained in a discharge gas. The apparatus employs a catalytic oxidation apparatus in which hydrochloric acid contained in the discharge gas is reacted with mercury in the presence of a catalyst at low temperature (300° C. or lower), to thereby form mercury chloride. The thus-formed mercury chloride is dissolved in water, whereby mercury contained in the discharge gas is removed.

However, when the aforementioned method employing an adsorbent such as activated carbon is employed, merely a small amount of mercury is adsorbed on the adsorbent. Therefore, when a large-volume discharge gas is treated, an excessive amount of mercury cannot be treated by the adsorbent.

When the above gas-liquid (discharge gas-liquid absorbent) contact method is employed, mercury chloride having high solubility in the liquid absorbent can be removed. In contrast, a large amount of metallic mercury, having low solubility in the liquid absorbent, cannot be removed, and metallic mercury must be removed by means of another apparatus.

In the discharge gas treatment method disclosed in Japanese Patent Application Laid-Open (kokai) No. 10-230137, addition of a mercury-chlorinating agent elevates treatment cost. In addition, unreacted chlorinating agent may corrode or break an apparatus such as a heat exchanger or an absorption-desulfurization tower, which is disposed on the downstream side of the gas flow.

The method of removing mercury contained in a discharge gas disclosed in Japanese Patent Application Laid-Open (kokai) No. 2000-197811 must employ a layer filled with a metal chloride or a similar material, leading to an increase in treatment cost. When the metal chloride powder is employed in the layer, a collection apparatus such as a collection filter for collecting reacted powder must be disposed, whereas when the metal chloride solution is used in the layer, a collection tank for collecting a solution after reaction must be disposed. As a result, apparatus cost increases.

The method of removing mercury contained in a discharge gas disclosed in Japanese Patent Application Laid-Open (kokai) No. 2003-53142 employs an additional catalytic oxidation apparatus. Therefore, apparatus cost is elevated.

SUMMARY OF THE INVENTION

The present invention has been conceived under such circumstances, and an object of the present invention is to provide a discharge gas treatment apparatus which prevents increase in treatment cost and which attains efficient removal of mercury contained in a discharge gas. Another object of the invention is to provide such a discharge gas treatment method.

Accordingly, in order to attain the above objects, in a first aspect of the invention, there is provided a discharge gas treatment apparatus for treating a discharge gas containing nitrogen oxide, sulfur oxide, metallic mercury, and hydrogen chloride, comprising temperature-controlling means for controlling the temperature of the discharge gas to a predetermined temperature in accordance with the hydrogen chloride concentration of the discharge gas;

a catalyst unit for reducing nitrogen oxide contained in the discharge gas for removal thereof and for causing reaction between mercury and hydrogen chloride contained in the discharge gas to thereby form mercury chloride, the discharge gas having been controlled to the predetermined temperature and having been introduced to the apparatus, with ammonia being added thereto; and removal means for removing sulfur oxide and mercury chloride contained in the discharge gas through dissolving sulfur oxide and mercury chloride in a liquid absorbent, the removal means being disposed on the downstream side with respect to the catalyst unit.

Examples of the liquid absorber include aqueous solutions of an absorbent such as calcium carbonate, calcium oxide, calcium hydroxide, sodium carbonate, or caustic soda.

Preferably, in the discharge gas treatment apparatus, the catalyst unit includes a first catalyst unit disposed on the upstream side of the gas flow direction and a second catalyst unit disposed on the downstream side with respect to the first catalyst unit, and the amount of ammonia added to the discharge gas is controlled in accordance with a predetermined percent $NO_x$ removal attainable by the first catalyst unit.

Preferably, the predetermined temperature is 300 to 400° C.

Preferably, the discharge gas apparatus further comprises hydrogen chloride concentration calculation means for calculating the hydrogen chloride concentration of the discharge gas in accordance with the composition of a fuel generating the discharge gas and the amount of the fuel employed, or hydrogen chloride concentration detection means for detecting the hydrogen chloride concentration of the discharge gas.

Preferably, the catalyst unit is formed of $TiO_2$—$WO_3$—$V_2O_5$ or $TiO_2$—$MoO_3$—$V_2O_5$.

Preferably, the catalyst unit comprises 100 parts by weight of $TiO_2$, 0.1 to 3 parts by weight of $V_2O_5$, and 1 to 20 parts by weight of $WO_3$ or $MoO_3$.

In a second aspect of the present invention, there is provided a discharge gas treatment method for treating a discharge gas containing nitrogen oxide, sulfur oxide, metallic mercury, and hydrogen chloride, the method comprising controlling the temperature of the discharge gas to a predetermined temperature in accordance with the hydrogen chloride concentration of the discharge gas;

adding ammonia to the discharge gas whose temperature has been controlled to the predetermined temperature;

bringing the discharge gas into contact with a catalyst unit so as to reduce the nitrogen oxide contained in the discharge gas for removal thereof and cause reaction between mercury and hydrogen chloride contained in the discharge gas to thereby form mercury chloride; and removing sulfur oxide and mercury chloride through dissolving sulfur oxide and mercury chloride in a liquid absorbent.

Preferably, in the discharge gas treatment method, the catalyst unit includes a first catalyst unit disposed on the upstream side of the gas flow direction and a second catalyst unit disposed on the downstream side with respect to the first catalyst unit, and the amount of ammonia added to the discharge gas is controlled in accordance with a predetermined percent $NO_x$ removal attainable by the first catalyst unit.

Preferably, the predetermined temperature is 300 to 400° C.

Preferably, the hydrogen chloride concentration of the discharge gas is calculated in accordance with the composition of a fuel generating the discharge gas and the amount of the fuel employed.

DETAILED DESCRIPTION OF PREFERRED EMBODIMENTS

Best modes for carrying out the present invention will be next described. Embodiments of the discharge gas treatment apparatus of the present invention will now be described.

Embodiment 1

Figure 1:
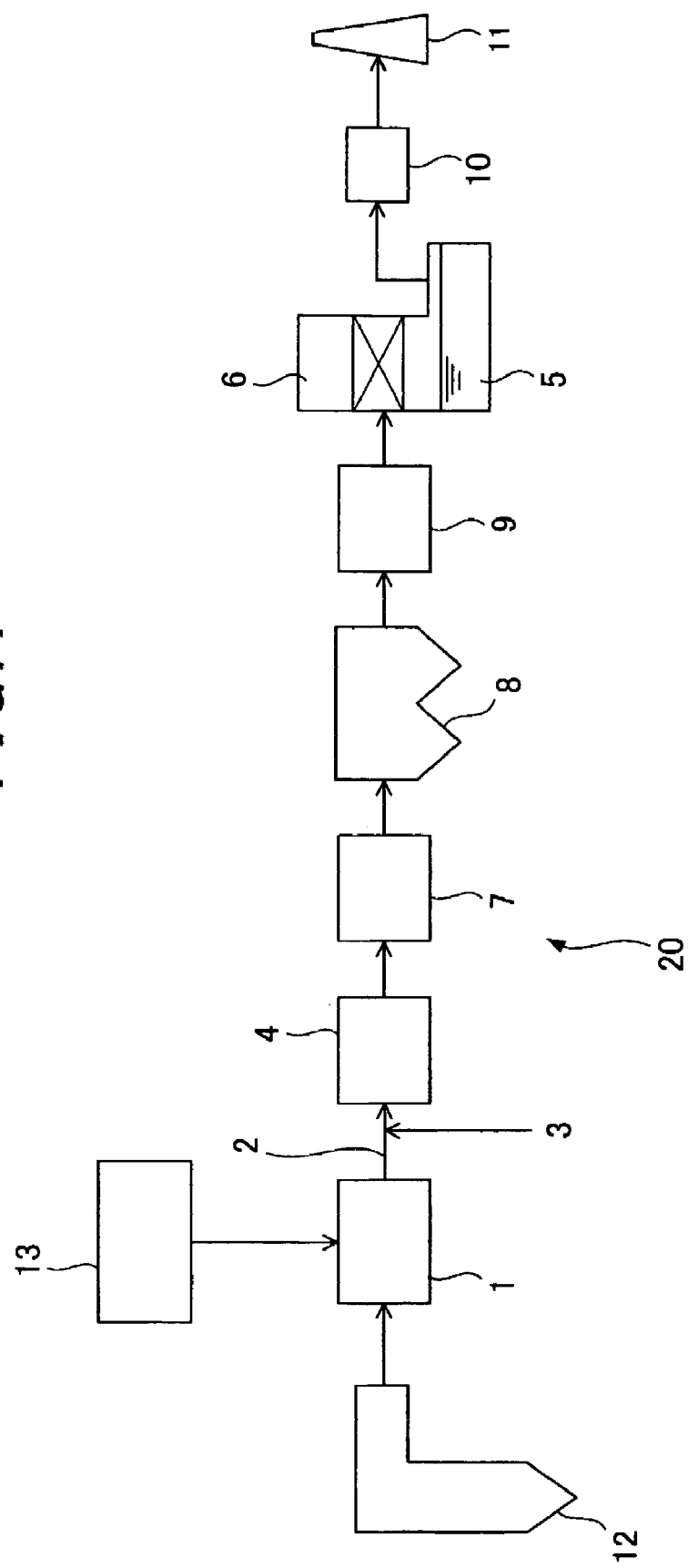
FIG. 1 is a diagramatic representation of a first embodiment of the discharge gas treatment apparatus according to the present invention.

With reference to FIG. 1, Embodiment 1 of the discharge gas treatment apparatus of the invention will be described. FIG. 1 is a diagramatic representation of Embodiment 1 of the discharge gas treatment apparatus according to the invention.

The present inventors have found that mercury contained in a discharge gas can be effectively reacted with hydrogen chloride contained in the same gas in the presence of an $NO_x$ removal catalyst through controlling the temperature of the discharge gas to fall within a predetermined range in accordance with the hydrogen chloride concentration of the discharge gas, whereby mercury chloride is formed.

In Embodiment 1 of the present invention, a discharge gas treatment apparatus 20, for treating a discharge gas containing nitrogen oxide, sulfur oxide, metallic mercury, and hydrogen chloride, includes a cooling apparatus 1 serving as temperature-controlling means for controlling the temperature of the discharge gas to a predetermined temperature in accordance with the hydrogen chloride concentration of the discharge gas; an $NO_x$ removal catalyst unit 4 disposed on the downstream side with respect to the cooling apparatus 1 and serving as a catalyst unit for reducing nitrogen oxide contained in the discharge gas 2 for removal thereof (i.e., decomposition to nitrogen and water) and for causing reaction between mercury and hydrogen chloride contained in the discharge gas to thereby form mercury chloride, the discharge gas having been controlled to the predetermined temperature and having been introduced to the apparatus, with ammonia 3 being added thereto; and a wet-format desulfurization apparatus 6 disposed on the downstream side with respect to the $NO_x$ removal catalyst unit 4 and serving as removal means for removing sulfur oxide and mercury chloride contained in the discharge gas through dissolving sulfur oxide and mercury chloride in a liquid absorbent 5.

Between the $NO_x$ removal catalyst unit 4 and the wet-format desulfurization apparatus 6, an air heater 7, a dust collector 8, and a heat exchanger 9 are sequentially disposed.

An additional heater; i.e., a re-heater 10 is connected to the wet-format desulfurization apparatus 6 on the downstream side, and a smokestack 11 is connected to the re-heater 10 on the downstream side. Through employment of the re-heater 10 at such a location, the discharge gas can be heated, whereby discharge of white smoke of vapor can be prevented during discharge of the gas through the smokestack 11.

The aforementioned discharge gas may be produced from a boiler of a thermal power plant, a manufacturing plant, or a similar facility. In Embodiment 1, the discharge gas is generated through combustion of a fuel in a boiler 12 disposed on the upstream side with respect to the cooling apparatus 1. The fuel may be a coal; i.e., a fuel containing mercury and chlorine. Specific examples include a US bituminous coal, containing mercury in an amount of 0.027 mg/kg to 0.10 mg/kg and chlorine in an amount of 52 mg/kg to 1,890 mg/kg; a US subbituminous coal, containing mercury in an amount of 0.065 mg/kg to 0.071 mg/kg and chlorine in an amount of 52 mg/kg to 662 mg/kg; and a US lignite coal, containing mercury in an amount of 0.073 mg/kg to 0.086 mg/kg and chlorine in an amount of 70 mg/kg to 200 mg/kg.

To the cooling apparatus 1, a calculator 13 for calculating the hydrogen chloride concentration of the discharge gas is connected. Specifically, the calculator 13 calculates the hydrogen chloride concentration of the discharge gas on the basis of the type and origin (country) of coal; i.e., the composition and amount of the coal supplied. The thus-calculated hydrogen chloride concentration data are transmitted to the cooling apparatus 1, where the temperature range of the discharge gas to be controlled is calculated on the basis of the hydrogen chloride concentration data. The temperature of the discharge gas is controlled by the cooling apparatus 1 so that the temperature falls within the above range.

The discharge gas which has been regulated by the cooling apparatus 1 has a temperature of 300 to 400° C., preferably 320 to 400° C. When the discharge gas temperature is lower than 300° C., sulfur trioxide reacts with ammonia at the $NO_x$ removal catalyst unit 4, to thereby form acidic ammonium sulfate ($NH_4SO_3$), which impairs $NO_x$ removal performance.

Examples of the $NO_x$ removal catalyst unit 4 include $TiO_2$—$WO_3$—$V_2O_5$ and $TiO_2$—$MoO_3$—$V_2O_5$. The $NO_x$ removal catalyst unit 4 comprises 100 parts by weight of $TiO_2$, 0.1 to 3 parts by weight of $V_2O_5$, and 1 to 20 parts by weight of $WO_3$ or $MoO_3$.

Through employment of the $NO_x$ removal catalyst unit 4 of such a composition, nitrogen oxide is reduced according to the schemes (2) and (3) below, and mercury chloride is formed according to the scheme (4) below.

$$4NO+4NH_3+O_2 \rightarrow 4N_2+6H_2O \quad (2)$$

$$NO+NO_2+2NH_3 \rightarrow 2N_2+3H_2O \quad (3)$$

$$2Hg+4HCl+O_2 \rightarrow 2HgCl_2+2H_2O \quad (4)$$

Notably, the amount of ammonia added to the discharge gas is controlled in accordance with a predetermined percent $NO_x$ removal, and the catalyst amount of the $NO_x$ removal catalyst unit 4 is regulated on the basis of a predetermined percent $NO_x$ removal and percent conversion to $Hg^{(2+)}$. If the amount of ammonia is regulated merely in consideration of $NO_x$ removal reaction, mercury chloride reacts with ammonia, to thereby form metallic mercury according to the following scheme (5):

$$4HgCl_2+4NH_3+O_2 \rightarrow 4Hg+8HCl+2N_2+2H_2O \quad (5).$$

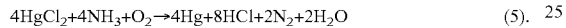

The wet-format desulfurization apparatus 6 to be employed in the invention may be a conventional desulfurizer. Examples of the liquid absorber 5 employed in the apparatus include aqueous solutions of an absorbent such as calcium carbonate, calcium oxide, calcium hydroxide, sodium carbonate, or caustic soda.

As described above, in the aforementioned discharge gas treatment apparatus 20, a discharge gas generated through combustion of a fuel in the boiler is fed to the cooling apparatus 1, where the discharge gas is cooled to a predetermined temperature in accordance with the hydrogen chloride concentration data calculated by the calculator 13. The ammonia 3 is added to the discharge gas 2 having a predetermined temperature, and the gas mixture is introduced to the $NO_x$ removal catalyst unit 4. In the $NO_x$ removal catalyst unit 4, nitrogen oxide contained in the discharge gas is removed through reduction, and mercury chloride is formed. The discharge gas containing mercury chloride is introduced to the wet-format desulfurization apparatus 6 via the air heater 7, the dust collector 8, and the heat exchanger 9. In the wet-format desulfurization apparatus 6, sulfur oxide and mercury chloride are dissolved in the liquid absorber 5, and removed. The treated gas is transferred from the wet-format desulfurization apparatus 6, and discharged via the re-heater 10 through the smokestack 11.

Thus, according to the discharge gas treatment apparatus 20 of Embodiment 1, the discharge gas temperature is controlled in accordance with the hydrogen chloride concentration of the discharge gas. Nitrogen oxide is removed through reduction by means of the $NO_x$ removal catalyst unit 4, while mercury chloride is formed through reaction between mercury and hydrogen chloride. The thus-formed mercury chloride is readily absorbed by the liquid absorber 5 placed in the wet-format desulfurization apparatus 6 disposed on the downstream side, whereby percent removal of mercury contained in the discharge gas can be enhanced.

The discharge gas treatment apparatus of the present invention can be constituted merely through addition, to a conventional discharge gas treatment apparatus, of a cooling apparatus for controlling the discharge gas temperature in accordance with the hydrogen chloride concentration of the discharge gas, and through employment of an $NO_x$ removal catalyst in an amount larger than the catalyst amount for attaining a predetermined percent $NO_x$ removal. As a result, increase in discharge gas treatment apparatus cost can be prevented, whereby increase in treatment cost can be prevented.

In Embodiment 1, the hydrogen chloride concentration of the discharge gas is calculated by means of the hydrogen chloride concentration calculator 13. However, instead of the hydrogen chloride concentration calculator 13, a hydrogen chloride concentration measuring apparatus (hydrogen chloride concentration measuring means) for determining hydrogen chloride concentration of the discharge gas may be employed, and the discharge gas temperature may be controlled to fall within a predetermined range by means of the cooling apparatus 1 on the basis of the hydrogen chloride concentration determined by means of the hydrogen chloride concentration measuring apparatus. Even when such a hydrogen chloride concentration measuring apparatus is employed, concentration data almost equivalent to those obtained by means of the hydrogen chloride concentration calculator 13 can be obtained.

Embodiment 2

Figure 2:
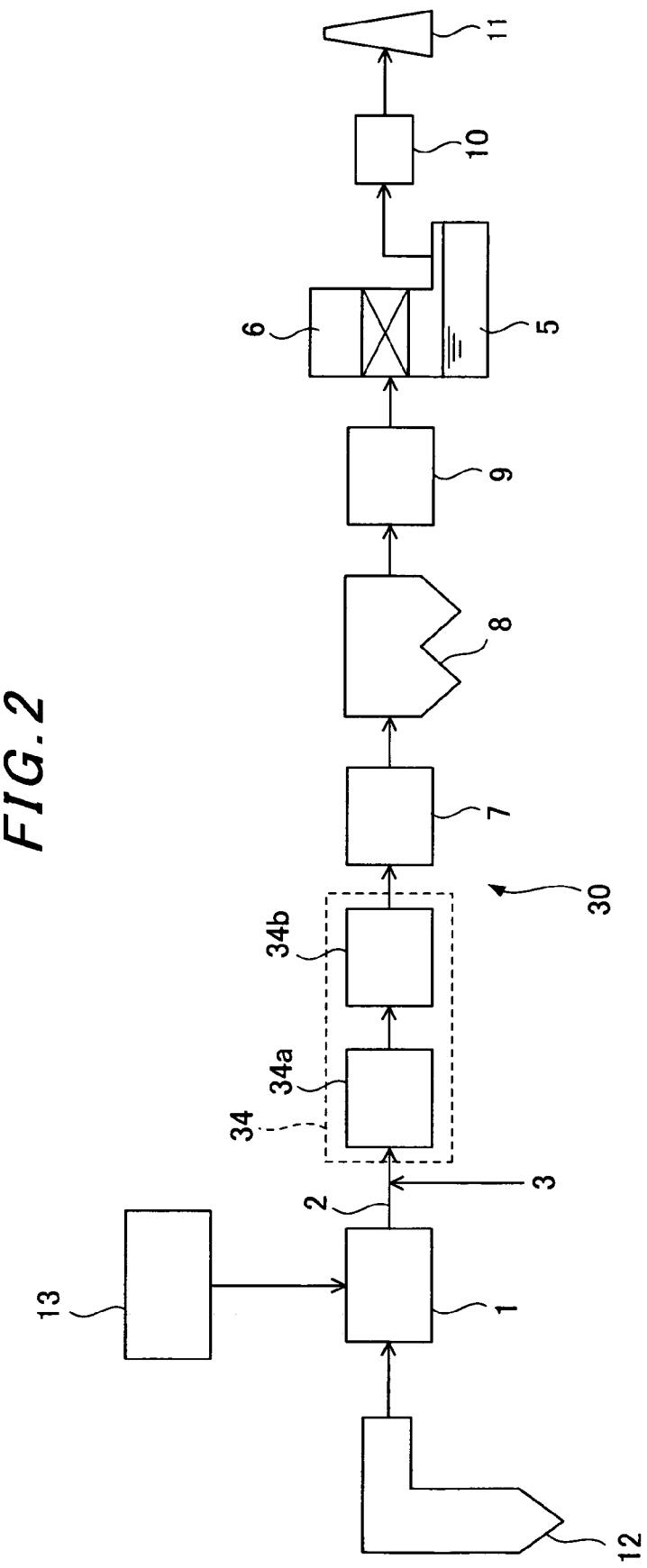
FIG. 2 is a diagramatic representation of a second embodiment of the discharge gas treatment apparatus according to the present invention.

With reference to FIG. 2, Embodiment 2 of the discharge gas treatment apparatus of the invention will be described in detail. The Embodiment 2 discharge gas treatment apparatus has almost the same structure as that of the aforementioned Embodiment 1 discharge gas treatment apparatus, except that the $NO_x$ removal catalyst unit is modified. The same reference numerals as employed in the aforementioned Embodiment 1 discharge gas treatment apparatus denote the same elements included in the Embodiment 2 discharge gas treatment apparatus, and overlapped description is omitted.

FIG. 2 is a diagrammatic representation of Embodiment 2 of the discharge gas treatment apparatus according to the invention.

As shown in FIG. 2, in Embodiment 2 of the present invention, a discharge gas treatment apparatus 30 has a catalyst unit 34 connected to a cooling apparatus 1 on the downstream side thereof. The catalyst unit 34 includes a first catalyst unit 34a and a second catalyst unit 34b disposed on the downstream side with respect to the first catalyst unit 34a. The first catalyst unit 34a is an $NO_x$ removal catalyst unit for mainly removing nitrogen oxide contained in the discharge gas through chemical reduction, and the second catalyst unit 34b is an $NO_x$ removal catalyst unit for mainly treating mercury contained in the discharge gas to thereby form mercury chloride. The amount of ammonia 3 added to the discharge gas is controlled in accordance with a predetermined percent $NO_x$ removal attainable by the first $NO_x$ removal catalyst unit 34a.

The first and second $NO_x$ removal catalyst unit 34a and 34b have the same composition as employed in the $NO_x$ removal catalyst unit 4 provided in the discharge gas treatment unit 20 of the aforementioned Embodiment 1.

According to the Embodiment 2 discharge gas treatment apparatus 30, the amount of ammonia 3 added to the discharge gas is controlled in accordance with a predetermined percent $NO_x$ removal attainable by the first $NO_x$ removal catalyst unit 34a. Therefore, introduction of ammonia 3 into the second $NO_x$ removal catalyst unit 34b is prevented, whereby reaction of ammonia with mercury chloride to form mercury is suppressed, and reaction between hydrogen chloride and mercury contained in the discharge gas effectively occurs in the second $NO_x$ removal catalyst unit 34b, to thereby form mercury chloride. As a result, percent conversion to $Hg^{(2+)}$ (i.e.; percent conversion of mercury to mercury chloride) at the second $NO_x$ removal catalyst unit 34b is enhanced. For the removal of mercury, the thus-formed mercury chloride is dissolved in the liquid absorber 5 placed in the wet-format desulfurization apparatus 6 disposed on the downstream side with respect to the second $NO_x$ removal catalyst unit 34b.

The discharge gas treatment apparatus 30 of Embodiment 2 attains the same effects as those exhibited by the apparatus 20 of Embodiment 1. In addition, since substantially no ammonia 3 is introduced to the second $NO_x$ removal catalyst unit 34b, reaction between hydrogen chloride and mercury contained in the discharge gas effectively occurs in the second $NO_x$ removal catalyst unit 34b, to thereby form mercury chloride at high efficiency. As a result, percent removal of mercury contained in the discharge gas is enhanced.

In the aforementioned discharge gas treatment apparatus 30, the cooling apparatus 1 is disposed on the upstream side with respect to the first $NO_x$ removal catalyst unit 34a. Alternatively, the cooling apparatus 1 may be disposed between the first and second $NO_x$ removal catalyst units 34a and 34b. Even when a discharge gas treatment apparatus having such a configuration is employed, effects almost equivalent to those attained by the aforementioned Embodiment 2 discharge gas treatment apparatus 30 can be attained.

Evaluation

The aforementioned discharge gas treatment apparatuses were evaluated in terms of hydrogen chloride concentration dependence of relationship between discharge gas temperature at $NO_x$ removal catalyst and conversion to $Hg^{(2+)}$, and in terms of relationship between discharge gas temperature and $NO_x$ removal catalyst amount.

Hydrogen chloride concentration dependence

Figure 3:
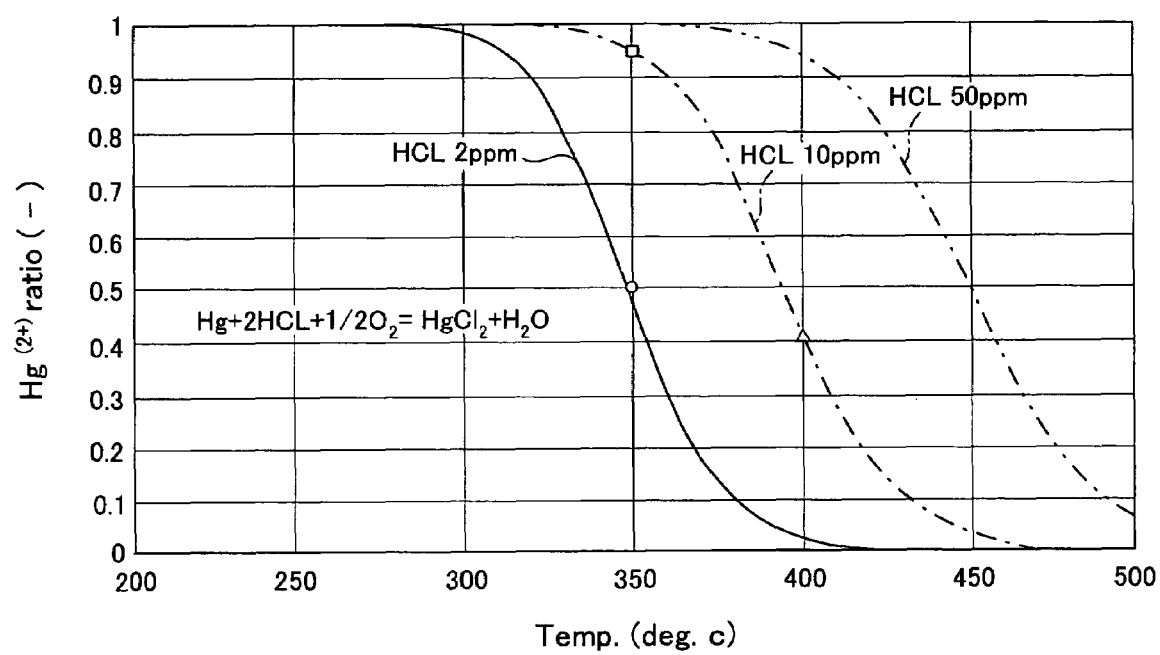
FIG. 3 is a graph showing relationship between discharge gas temperature and percent conversion to $Hg^{(2+)}$ in an $NO_x$ removal catalyst unit, as well as hydrogen chloride concentration dependence thereof.

Percent conversion to $Hg^{(2+)}$ of an $NO_x$ removal catalyst formed of $TiO_2$—$V_2O_5$—$WO_3$ (100:0.8:10.5) was determined at various discharge gas temperatures, and hydrogen chloride of the percent conversion-gas temperature curve relationship was determined. FIG. 3 shows the results. The gas and test conditions employed in the performance evaluation are collectively listed in Table 1. In FIG. 3, the solid line represents conversion to $Hg^{(2+)}$ at a hydrogen chloride concentration of 2 ppm; the single-dot chain line represents conversion to $Hg^{(2+)}$ at a hydrogen chloride concentration of 10 ppm; and the two-dot chain line represents conversion to $Hg^{(2+)}$ at a hydrogen chloride concentration of 50 ppm.

TABLE 1

| Catalyst | $TiO_2$:$WO_3$:$V_2O_5$ = 100:10.5:0.8 |
|---|---|
| Catalyst shape | 45.55 mm (6 holes) × 45.55 mm (6 holes) × 1,000 mm – length × 2 |
| Gas flow | 9.92 $m^3N/h$ |
| Ugs | 1.5 mN/sec |
| AV | 10.8 $m^3N/m^2 \cdot h$ (Outlet of 1st catalyst) |
| | 5.4 $m^3N/m^2 \cdot h$ (Outlet of 2nd catalyst) |
| Gas temperature | 320° C., 350° C., 400° C. |
| Gas characteristics | Hg: about 20 μg/$Nm^3$ |
| | ($Hg^{(2+)}$: 0.3 μmg/$Nm^3$, $Hg^{(0)}$: 19.7 μg/$Nm^3$) |
| | $NO_x$: 350 ppm |
| | $NH_3$: 315 ppm |
| | $SO_x$: 1,000 ppm |
| | HCl: 10 ppm |
| | $O_2$: 4.0% |

TABLE 1-continued

| $CO_2$: about 14% |
|---|
| $H_2O$: about 13% |
| $N_2$: balance |

As shown in FIG. 3, when the hydrogen chloride concentration of the discharge gas was 50 ppm, percent conversion to $Hg^{(2+)}$ was about 1.0 at a discharge gas temperature of about 360° C. As the discharge gas temperature was elevated, percent conversion to $Hg^{(2+)}$ gradually decreased to about 0.95 (discharge gas temperature: 400° C.) and further to 0.5 (discharge gas temperature: 450° C.). When the hydrogen chloride concentration of the discharge gas was 10 ppm, percent conversion to $Hg^{(2+)}$ was about 1.0 at a discharge gas temperature of about 330° C. As the discharge gas temperature was elevated, percent conversion to $Hg^{(2+)}$ gradually decreased to about 0.95 (discharge gas temperature: 350° C.) and further to about 0.41 (discharge gas temperature: 400° C.). When the hydrogen chloride concentration of the discharge gas was 2 ppm, percent conversion to $Hg^{(2+)}$ was about 0.98 at a discharge gas temperature of 300° C. As the discharge gas temperature was elevated, percent conversion to $Hg^{(2+)}$ gradually decreased to about 0.50 (discharge gas temperature: 350° C.).

As is clear from FIG. 3, percent conversion to $Hg^{(2+)}$ attained in an $NO_x$ removal catalyst can be tuned through controlling the discharge gas temperature to fall within a predetermined range in accordance with the hydrogen chloride concentration of the discharge gas.

Assessing of the Amount of $NO_x$ Removal Catalyst Required

The amount of $NO_x$ removal catalyst required was assessed under the test conditions shown in Table 1. The tested $NO_x$ removal catalyst was formed of two linearly linked catalyst units, each having dimension of 45.55 mm (6 holes)×45.55 mm (6 holes)×1,000 mm-length. The discharge gas shown in Table 1 was caused to pass through the $NO_x$ removal catalyst of the above structure under the conditions shown in Table 1. Percent conversion to $Hg^{(2+)}$ and percent $NO_x$ removal were determined at the outlet of the first catalyst unit (AV=10.8 $M^3N/m^2 \cdot h$) and the outlet of the second catalyst unit (AV=5.4 $m^3N/m^2 \cdot h$). In Table 1, Ugs refers to a superficial velocity ((flow rate of fluid)/(flow path cross-section)), and AV refers to an area velocity ((gas flow rate)/(total catalyst contact area)). The amount of ammonia to be added was determined such that a percent $NO_x$ removal of 90% was attained.

Table 2 below shows the above results.

In Table 2, percent conversion to $Hg^{(2+)}$ and percent $NO_x$ removal are defined as follows.

Percent conversion to $Hg^{(2+)}$ (%)=((1–outlet $Hg^{(0)}$ concentration)/(inlet $Hg^{(0)}$ concentration)×100

Percent $NO_x$ removal (%)=((1–outlet $NO_x$ concentration)/(inlet $NO_x$ concentration)×100

TABLE 2

| | First catalyst unit outlet | | | | | Second catalyst unit outlet | | | | |
|---|---|---|---|---|---|---|---|---|---|---|
| | $Hg^{(2+)}$ (μg/Nm³) | $Hg^{(0)}$ (μg/Nm³) | Percent conversion to $Hg^{(2+)}$ (%) | $NO_x$ (ppm) | Percent $NO_x$ removal (%) | $Hg^{(2+)}$ (μg/Nm³) | $Hg^{(0)}$ (μg/Nm³) | Percent conversion to $Hg^{(2+)}$ (%) | $NO_x$ (ppm) | Percent $NO_x$ removal (%) |
| 320° C. | 13.9 | 6.1 | 69.0 | 41.3 | 88.2 | 18.9 | 1.1 | 94.4 | 37.1 | 89.4 |
| 350° C. | 7.5 | 12.5 | 36.5 | 34.8 | 90.1 | 16.7 | 3.3 | 83.2 | 33.3 | 90.5 |
| 400° C. | 2.0 | 18.0 | 8.6 | 35.0 | 90.0 | 7.4 | 12.6 | 36.0 | 34.4 | 90.2 |

As shown in Table 2, removal of nitrogen oxide contained in the discharge gas was complete at the outlet of the first catalyst unit at a discharge gas temperature of 320° C., 350° C., or 400° C. Percent conversion to $Hg^{(2+)}$ was higher at the second catalyst unit outlet than at the first catalyst unit outlet. In other words, ammonia contained in the discharge gas inhibited conversion of $Hg^{(0)}$ to $Hg^{(2+)}$. Furthermore, percent conversion to $Hg^{(2+)}$ was higher at a discharge gas temperature of 350° C. than at a discharge gas temperature of 400° C., and still higher at a discharge gas temperature of 320° C.

As described hereinabove, according to the discharge gas treatment apparatus of the present invention, the discharge gas temperature is controlled in accordance with the hydrogen chloride concentration of the discharge gas, nitrogen oxide is reduced for removal thereof in the presence of a catalyst unit, and mercury contained in the discharge gas is reacted with hydrogen chloride, to thereby form mercury chloride. The thus-formed mercury chloride can be readily dissolved in a liquid absorbent in treatment means disposed on the downstream side of the apparatus. As a result, percent removal of mercury contained in the discharge gas can be elevated.

Furthermore, the discharge gas treatment apparatus of the present invention is constituted simply through provision of temperature-controlling means for controlling the temperature of the discharge gas in accordance with the hydrogen chloride concentration of the discharge gas, and a catalyst unit having a larger catalyst amount so as to attain a predetermined percent $NO_x$ removal. As a result, increase in discharge gas treatment apparatus cost can be prevented, whereby increase in treatment cost can be prevented.

The discharge treatment method of the present invention for treating a discharge gas containing nitrogen oxide, sulfur oxide, metallic mercury, and hydrogen chloride comprises controlling the temperature of the discharge gas to a predetermined temperature in accordance with the hydrogen chloride concentration of the discharge gas; adding ammonia to the discharge gas whose temperature has been controlled to the predetermined temperature; bringing the discharge gas into contact with a catalyst unit so as to reduce the nitrogen oxide contained in the discharge gas for removal thereof and cause reaction between mercury and hydrogen chloride contained in the discharge gas to thereby form mercury chloride; and removing sulfur oxide and mercury chloride through dissolving sulfur oxide and mercury chloride in a liquid absorbent. Thus, metallic mercury contained in the discharge gas can be readily removed. According to the present invention, percent removal of metallic mercury contained in the discharge gas can be enhanced, and increase in treatment cost can be prevented.

Thus, the present invention can provide a discharge gas treatment apparatus and discharge gas treatment method for removing mercury contained in a gas discharged from a boiler or a similar apparatus.

FIG. 1
1 Cooling apparatus
2 Predetermined-temperature discharge gas
3 Ammonia
4 $NO_x$ removal catalyst unit
6 Wet-format desulfurization apparatus
7 Air heater
8 Dust collector
9 Heat exchanger
10 Re-heater
11 Smokestack
12 Boiler
13 Calculator
20 Discharge gas treatment apparatus FIG. 2
1 Cooling apparatus
34 $NO_x$ removal catalyst unit
6 Wet-format desulfurization apparatus
13 Calculator

What is claimed is:

1. A discharge gas treatment apparatus for treating a discharge gas containing nitrogen oxide, sulfur oxide, metallic mercury, and hydrogen chloride, comprising
    temperature-controlling means for controlling the temperature of the discharge gas to a predetermined temperature in accordance with a hydrogen chloride concentration of the discharge gas;
    a catalyst unit for reducing nitrogen oxide contained in the discharge gas for removal thereof and for causing reaction between mercury and hydrogen chloride contained in the discharge gas to thereby form mercury chloride, the discharge gas having been controlled to the predetermined temperature and having been introduced to the apparatus, with ammonia being added thereto; and
    removal means for removing sulfur oxide and mercury chloride contained in the discharge gas through dissolving sulfur oxide and mercury chloride in a liquid absorbent, the removal means being disposed on the downstream side with respect to the catalyst unit.

2. A discharge gas treatment apparatus as described in claim 1, wherein the catalyst unit includes a first catalyst unit disposed on the upstream side of the gas flow direction and a second catalyst unit disposed on the downstream side with respect to the first catalyst unit, and the amount of ammonia added to the discharge gas is controlled in accordance with a predetermined percent $NO_x$ removal attainable by the first catalyst unit.

3. A discharge gas treatment apparatus as described in claim 1, wherein the predetermined temperature is 300 to 400° C.

4. A discharge gas treatment apparatus as described in claim 1, which further comprises hydrogen chloride concentration calculation means for calculating the hydrogen chloride concentration of the discharge gas in accordance with the composition of a fuel generating the discharge gas and the amount of the fuel employed, or hydrogen chloride concentration detection means for detecting the hydrogen chloride concentration of the discharge gas.

5. A discharge gas treatment apparatus as described in claim 1, wherein the catalyst unit is formed of $TiO_2$—$WO_3$—$V_2O_5$ or $TiO_2$—$MoO_3$—$V_2O_5$.

6. A discharge gas treatment apparatus as described in claim 5, wherein the catalyst unit comprises 100 parts by weight of $TiO_2$, 0.1 to 3 parts by weight of $V_2O_5$, and 1 to 20 parts by weight of $WO_3$ or $MoO_3$.

7. A discharge gas treatment method for treating a discharge gas containing nitrogen oxide, sulfur oxide, metallic mercury, and hydrogen chloride, the method comprising
controlling the temperature of the discharge gas to a predetermined temperature in accordance with a hydrogen chloride concentration of the discharge gas;
adding ammonia to the discharge gas whose temperature has been controlled to the predetermined temperature;
bringing the discharge gas into contact with a catalyst unit so as to reduce the nitrogen oxide contained in the discharge gas for removal thereof and cause reaction between mercury and hydrogen chloride contained in the discharge gas to thereby form mercury chloride; and
removing sulfur oxide and mercury chloride through dissolving sulfur oxide and mercury chloride in a liquid absorbent.

8. A discharge gas treatment method as described in claim 7, wherein the catalyst unit includes a first catalyst unit disposed on the upstream side of the gas flow direction and a second catalyst unit disposed on the downstream side with respect to the first catalyst unit, and the amount of ammonia added to the discharge gas is controlled in accordance with a predetermined percent $NO_x$ removal attainable by the first catalyst unit.

9. A discharge gas treatment method as described in claim 7, wherein the predetermined temperature is 300 to 400° C.

10. A discharge gas treatment method as described in claim 7, wherein the hydrogen chloride concentration of the discharge gas is calculated in accordance with the composition of a fuel generating the discharge gas and the amount of the fuel employed.

* * * * *